(12) United States Patent
Sartain et al.

(10) Patent No.: US 6,395,669 B1
(45) Date of Patent: May 28, 2002

(54) CATALYST COMPONENT AND SYSTEM

(75) Inventors: William J. Sartain, West Chester, OH (US); Patricia A. Hooks, Hazel Crest, IL (US); Keta M. Lindstrom, Plainfield, IL (US); Stella L. Ellis, Crest Hill, IL (US); Douglas D. Klendworth, West Chester; Albert P. Masino, Hamilton, both of OH (US); Richard W. Fries, Joliet, IL (US); Therese A. Pastrick, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 44 days.

(21) Appl. No.: 09/626,639

(22) Filed: Jul. 27, 2000

Related U.S. Application Data

(63) Continuation of application No. 08/781,731, filed on Jan. 10, 1997, now abandoned.
(60) Provisional application No. 60/010,209, filed on Jan. 18, 1996.

(51) Int. Cl.$^7$ .............................. B01J 31/00; B01J 37/00; C08F 4/02; C08F 4/60
(52) U.S. Cl. ..................... 502/125; 502/119; 502/113; 502/114; 502/132; 502/133; 502/134; 502/110; 502/129
(58) Field of Search ................ 502/110, 113, 502/114, 119, 125, 129, 103, 132, 133, 134

(56) References Cited

U.S. PATENT DOCUMENTS

| | | | |
|---|---|---|---|
| 4,004,070 A | 1/1977 | Farrar | |
| 4,374,753 A | 2/1983 | Pullukat et al. | |
| 4,404,344 A | 9/1983 | Sinn et al. | |
| 4,522,982 A | 6/1985 | Ewen | |
| 4,530,913 A | 7/1985 | Pullukat et al. | |
| 4,530,914 A * | 7/1985 | Ewen et al. | 502/113 |
| 4,701,432 A | 10/1987 | Welborn | |
| 4,937,299 A | 6/1990 | Ewen et al. | |
| 5,032,562 A | 7/1991 | Lo et al. | |
| 5,077,255 A | 12/1991 | Welborn | |
| 5,086,025 A | 2/1992 | Chang | |
| 5,120,696 A | 6/1992 | Tsutsui et al. | |
| 5,183,867 A | 2/1993 | Welborn | |
| 5,614,456 A * | 3/1997 | Mink et al. | 502/113 |
| 5,990,034 A * | 11/1999 | Nozaki | 502/133 |
| 6,051,666 A * | 4/2000 | Zakharov et al. | 502/133 |
| 6,103,655 A * | 8/2000 | Luciani et al. | 502/133 |
| 6,214,950 B1 * | 4/2001 | Takashi | 502/133 |

FOREIGN PATENT DOCUMENTS

| | | | |
|---|---|---|---|
| JP | 7-2922 | * | 4/1994 |
| JP | 7-2922 | | 7/1996 |

* cited by examiner

Primary Examiner—Mark L. Bell
Assistant Examiner—J. Pasterczyk
(74) Attorney, Agent, or Firm—Kevin M. Carroll

(57) ABSTRACT

A catalyst component formed by the steps of contacting a transition metal-containing metallocene of a transition metal of Group 4, 5 or 6 of the Periodic Table of the Elements with silica or an organic support. This product is contacted with an organomagnesium compound or complex followed by contact with an alcohol and a silane. Finally, the so-contacted product is contacted with a Group 4, 5 or. 6 transition metal-containing non-metallocene compound. The component is preferably combined with an aluminum-containing cocatalyst to form a catalyst system.

14 Claims, No Drawings

CATALYST COMPONENT AND SYSTEM

REFERENCE TO RELATED APPLICATION

This is a continuation of application Ser. No. 08/781,731, filed Jan. 10, 1997, now abandoned, which claims priority of provisional U.S. patent application, Ser. No. 60/010,209, filed Jan. 18, 1996.

FIELD OF THE INVENTION

The instant invention relates to a mixed metallocene/Ziegler polymerization catalyst component and catalyst system for the polymerization or copolymerization of one or more alpha-olefins.

The mixed metallocene/Ziegler polymerization catalyst component of the present invention when used with one or more aluminum-containing cocatalysts, produces a catalyst system which produces olefin polymer films having improved clarity and strength properties compared with olefin polymer films produced using catalyst systems of the prior art.

BACKGROUND OF THE INVENTION

Traditionally, ethylene and alpha-olefins have been polymerized or copolymerized in the presence of hydrocarbon insoluble catalyst systems comprising a transition metal component, such as titanium, and an aluminum alkyl. An example of such a system is set. forth in U.S. Pat. No. 4,374,753. That system includes a transition metal component formed by reacting certain organic silicon compounds with an oxide, such as a silica or alumina, having surface hydroxyl groups. The reaction product is thereupon reacted with an organomagnesium compound. This product, in turn, is reacted with an alcohol. The final catalyst component is formed by reaction of the previous product with a halide or an alkoxide of titanium, vanadium, zirconium or mixtures thereof.

More recently, active homogeneous catalyst systems comprising a bis(cyclopentadienyl)-transition metal dialkyl, an aluminum trialkyl, and water have been found to be useful for the polymerization of ethylene. Such catalyst systems are referred to in the art as homogeneous metallocene catalyst-systems and are generally recognized as being unsupported. U.S. Pat. Nos. 4,404,344, 4,522,982, 4,590,914 and 4,937,299 describe various homogeneous metallocene catalyst systems of this type used in alpha-olefin polymerizations.

An advantage of a metallocene/aluminoxane homogeneous catalyst system is the very high activity obtained-in ethylene polymerization. Another significant advantage is, unlike olefin polymers produced in the presence of conventional heterogeneous Ziegler-type catalysts, terminal unsaturation is present in polymers produced in polymerization reactions conducted in the presence of homogeneous metallocene catalysts. Nevertheless, these metallocene-catalysts suffer from a disadvantage; that is, the ratio of aluminoxane to metallocene is high, for example, on the order of 1,000 to 1 or greater. Such voluminous amounts of aluminoxane require extensive posttreatment of the polymer product obtained in order to remove the undesirable aluminum.

A second disadvantage of homogeneous metallocene catalysts, which disadvantage is also associated with traditional heterogeneous Ziegler-type catalysts, is the multiplicity of delivery systems required for introducing the individual catalyst components into the polymerization reactor.

In an attempt to overcome the problems mentioned hereinabove, supported, also known in the art as heterogeneous, metallocene catalyst systems have been developed. One such supported metallocene catalyst system is described in U.S. Pat. No. 5,086,025 to Chang. Chang discloses a process for preparing a supported metallocene-aluminoxane catalyst system for use in liquid or slurry phase polymerization of olefins wherein the preparation of the supported heterogeneous metallocene catalyst involves initially reacting silica gel with an aluminum trialkyl solution to form a support material for the metallocene component and thereafter contacting the treated support material with a metallocene.

In addition to the use of heterogeneous metallocene catalyst systems, the art has recognized that benefits may be obtained by joining metallocene with Ziegler-Natta catalyst technology in low pressure polyolefin synthesis in conventional reactors; these preparations, generally known as mixed catalyst systems, thus comprise a catalyst component which includes Ziegler-Natta and metallocene catalytic agents. Some pertinent examples of such art follow.

U.S. Pat. No. 4,701,432 to Wellborn, Jr. is directed to an olefin polymerization catalyst component which comprises a support treated with a metallocene of a Group IVB or VB metal and at least one non-metallocene compound of a Group IVB, VB or VI transition metal. A catalyst system is also set forth which includes the aforementioned catalyst component and a cocatalyst comprising an aluminoxane and an organometallic compound of a metal of Groups IA, IIA, IIB or IIIA.

U.S. Pat. No. 5,032,562 to Lo et al. discloses a supported olefin polymerization catalyst composition comprising a precursor and a catalyst activator. The catalytic precursor comprises a magnesium compound, e.g., dibutylmagnesium, a cyclopentadienyl group-containing zirconium compound, a titanium and/or a vanadium compound and an organic compound. The catalyst activator is a mixture of a conventional Ziegler-Natta cocatalyst and a zirconium site activator, e.g., methylaluminumoxane. The catalyst is used in the presence of small amounts of hydrogen to produce polymers having a multimodal molecular weight distribution in a single reactor.

U.S. Pat. Nos. 5,077,255 and 5,183,867 to Welborn, Jr. disclose an olefin polymerization supported catalyst comprising the supported reaction product of at least one metallocene of a metal of Group IVB, VB or VIB of the Periodic Table, a non-metallocene transition metal-containing compound of a Group IVB, VB or VIB metal and an aluminoxane. The supported product is reportedly useful for the polymerization of olefins especially ethylene and especially for the copolymerization of ethylene and other mono- and diolefins.

U.S. Pat. No. 5,120,696 to Tsutsui et al. provides olefin polymerization catalysts and a method of preparing the same. Specifically, in one embodiment, this references discloses an olefin polymerization catalyst that comprises: (A) a solid titanium catalyst component containing titanium, magnesium and a halogen as its essential ingredients, said catalyst component having supported thereon (B) a transition metal compound containing a ligand having a cycloalkadienyl skeleton and, if necessary, (C) an organoaluminum oxy-compound. In another embodiment, there is disclosed an olefin polymerization catalyst composition that comprises (A) a solid containing a transition metal compound having a cycloalkadienyl skeleton and supporting thereon; (B) a titanium catalyst component containing titanium, magnesium and a halogen as its essential ingredients, and, if necessary (C) an organoaluminum oxy-compound.

Japanese Patent Publication No. 7-2922 published Jan. 6, 1995 includes an example which discloses the synthesis of an olefin polymerization catalyst in which biscyclopentadienyl zirconium dichloride is added to hexamethyldisilazane modified silica in the solvent, dichloromethane. After evaporation of the solvent, a lavender colored solid is formed. A solution of triethylaluminum-diethylmagnesium complex in heptane is then added to the solid followed by the addition of first n-butanol and then titanium tetrachloride, each in the form of heptane solutions. The catalyst is employed in the polymerization of ethylene. The polymerization occurs in the presence of modified methyl aluminoxane, i.e. methyl aluminoxane containing isobutyl groups.

Notwithstanding these efforts, the art continues to seek olefin polymerization catalysts that have improved properties associated with the many uses to which olefin polymers are put.

SUMMARY OF THE INVENTION

The present invention is directed to a mixed metallocene/Ziegler polymerization catalyst component which is useful in the polymerization or copolymerization of one or more alpha-olefins. More specifically, the mixed metallocene/Ziegler catalyst component of the instant invention comprises a metallocene compounds commonly utilized in the formation of a Ziegler-type polymerization catalyst component.

In accordance with the instant-invention, and representative thereof, a catalyst component is prepared by contacting an organic or silica support material with at least one transition metal metallocene compound. This contact product is then contacted with an organomagnesium compound or complex, then with an alcohol and/or a silane, and finally with a non-metallocene transition metal-containing compound of a transition metal of Group 4, 5 or 6 of the Periodic Table of the Elements with the proviso that the transition metal of the non-metallocene compound is not titanium if the transition metal metallocene is a zirconocene.

To form the catalyst system of the instant invention, the aforementioned catalyst component is contacted with one or more aluminum-containing cocatalyst compounds, including those aluminum-containing cocatalysts well known in the polymerization art, e.g., aluminum alkyls or aluminoxanes.

In another aspect of the present invention, a process for polymerizing or copolymerizing one or more alpha-olefins is disclosed. In this process, an alpha-olefin or mixture of alpha-olefins is (co)polymerized under olefin polymerization conditions utilizing the inventive catalyst system, which includes the above-described catalyst component and at least one aluminum-containing cocatalyst.

DETAILED DESCRIPTION OF THE INVENTION

A preferred catalyst component utilized in the present catalyst system is prepared by initially contacting a support, either silica or an organic solid, such as a polyolefin, with at least one transition metal metallocene compound, by adding the metallocene compound to the support and thereafter contacting that reaction product with components employed in the synthesis of traditional Ziegler-type catalyst components.

In one embodiment, as stated above, the support is silica. The silica employed has a large surface area and large pore volume.

The silica employed in the current mixed metallocene/Ziegler catalyst component is preferably pure; however, it may contain minor amounts of other inorganic oxides. In general, the silica when used as a support, comprises at least about 95% by weight pure silica. In one preferred embodiment the silica is at least about 99% pure.

The silica support utilized in the preparation of the mixed metallocene/Ziegler catalyst component is preferably a high surface area, high pore volume material defined by a surface area between about 50 $m^2/g$ and about 500 $m^2/g$; a median particle size of about 20 microns to about 200 microns; and a pore volume of about 0.5 cc/g to about 2.4 cc/g, as determined by standard Brunauer, Emmett and Teller (BET) measurements.

In a preferred embodiment of the present invention, the silica support is pretreated prior to use to remove any impurities and/or to reduce the number of surface hydroxyl groups which may, under certain circumstances, inhibit the activity of the resultant mixed metallocene/Ziegler catalyst component.

To effectuate adequate reduction of hydroxyl groups from the surface of silica, the silica may be calcined in an inert atmosphere at a temperature of at least about 150° C. Preferably, calcination of the silica is performed at a temperature of from about 150° C. to about 650° C. in an inert gas atmosphere, e.g. nitrogen or argon.

Another method of reducing the surface hydroxyl group content of the silica support involves contacting silica with a hexaalkyl disilazane or a chlorosilane, as disclosed in U.S. Pat. No. 4,530,913 to Pullukat et al. Of the hexaalkyl disilazane useful in this application, hexamethyl disilazane, i.e., HMDS, is particularly preferred.

The silica support may also be pretreated by combining calcination and treatment with a hexaalkyl disilazane. In this method, the sequence of pretreatment may be random; however, it is preferred that the hexaalkyl disilazane treatment precede the calcination process.

In the practice of the invention, at least one metallocene compound is added to the support. The metallocene compound is represented by one or more of the following formulas I, II or III:

$$(Cp)_a MR_b X_c \qquad (I)$$

wherein Cp is an unsubstituted cyclopentadienyl, indenyl, or fluorenyl ring; M is a transition metal of Group 4, 5 or 6 of the Periodic Table of the Elements; R is hydrogen or a hydrocarbyl group having from 1 to about 20 carbon atoms; X is halogen; a is an integer of 1 to 3; b is 0 or an integer of 1 to 3; c is 0 or an integer of 1 to 3; with the proviso that the sum of a+b+c is equal to the oxidation state of M.

$$(CpR^1{}_k)_g R^2{}_s (CpR^1{}_k) MQ_{3-g} \qquad (II)$$

$$R^2{}_s (CpR^1{}_k)_2 MQ' \qquad (III)$$

wherein Cp has the meanings given above; each $R^1$ is the same or different and is hydrogen, a hydrocarbyl radical such as alkyl, alkenyl, aryl, alkaryl or aralkyl radical containing from 1 to about 20 carbon atoms, or are two carbon atoms bridging Cp groups into a ring; $R^2$ is a $C_1-C_4$ alkylene radical, a dialkyl germanium or silicon, or an alkyl pliosphine or amine radical bridging two $(CpR^1{}_k)$ rings; Q is a hydrocarbyl radical such as aryl, alkyl, alkenyl, alkaryl or aralkyl having from about 1 to about 20 carbon atoms, a hydrocarbyloxy radical having from about 1 to about 20 carbon atoms or a halogen and each Q can be the same or different; Q' is an alkylidiene radical having from about 1 to about 20 carbon atoms; s is 0 or 1; g is 0, 1 or 2; with the proviso that s is 0 when g is 0, k is 4 when s is 1, and k is 5 when s is 0, and M is as defined above.

Transition metals within the contemplation of the metallocene compounds within the scope of this invention encompass all the metals of Groups 4, 5 and 6 of the Periodic Table of the Elements. Preferably, M is zirconium, hafnium, titanium, vanadium or chromium. More preferably, M is zirconium or hafnium.

Hydrocarbyls contemplated by the present invention include methyl, ethyl, propyl, butyl, amyl, isoamyl, hexyl, isobutyl, heptyl, octyl, nonyl, decyl, cetyl, 2-ethylhexyl, phenyl and the like.

Exemplary halogen atoms include chlorine, bromine, fluorine and iodine and of these chlorine is preferred.

In the practice of the present invention, when Q is hydrocarbyloxy it is preferred that the hydrocarbyloxy radicals be methoxy, ethoxy, butoxy, amyloxy or the like.

Alkylidienes having the meaning Q, in formula III include methylidiene, ethylidiene and propylidiene.

The above description of metallocene compounds within the contemplation of the present invention is restricted by the requirement that if the metallocene is zirconocene dichloride then the transition metal compound of the Ziegler catalyst component, discussed below, cannot betitanium tetrachloride.

It should be noted that the contacting step between the support and the metallocene compound occurs in the presence of a suitable organic solvent which is inert and capable of solubilizing the metallocene component, as well as the other components employed in the instant invention. Typically, the solvent employed in the preparation of the catalyst component of the present invention is any aliphatic or aromatic hydrocarbon, liquid at ambient conditions. More preferably, the solvent is an aliphatic or aromatic hydrocarbon containing 5 to 15 carbon atoms. Still more preferably, the hydrocarbon is a $C_5$–$C_8$ aromatic or aliphatic hydrocarbon. Even more preferably, the solvent is an aromatic hydrocarbon such as toluene or an aliphatic hydrocarbon such as heptane. It is particularly preferred that the solvent be toluene.

Prior to use, the organic solvent should be purified by techniques well known in the art, e.g. by distillation or by percolation through silica gel and/or molecular sieves, to remove trace quantities of water, oxygen, polar compounds, and other materials capable of adversely affecting the catalyst activity. Contact between the support material and the metallocene typically occurs at a temperature of from about 0° C. to about 150° C. More preferably, the temperature of this contacting step is in the range from about 20° C. to about 120° C. Most preferably, the temperature is from about 30° C. to about 100° C.

The time duration of the contact between the support material and the metallocene compound is from about 5 minutes to about 2 hrs. More preferably, the contacting step occurs over a period of about 0.25 hrs to about 2 hrs. Most preferably, the time duration of this contacting step is between 0.5 hrs to about 1.5 hrs.

The concentration of the metallocene compound employed in the present invention, based on the amount of support material, is from about 0.001 to 10 mmol per gram of support. More preferably, the concentration of the metallocene component is from about 0.01 to 5 mmol per gram of support.

In a preferred embodiment contact between the support and the metallocene solution is such that "incipient wetness" is provided. Incipient wetness occurs when the volume of the liquid metallocene solution is equal to or less than the cumulative pore volume of the support material in contact with the metallocene solution.

In the preferred embodiment wherein contact between the support and the liquid metallocene solution occurs under incipient wetness conditions, the volume of metallocene solution is in the range of between about 40% and about 100% of the total pore volume of the support contacting the metallocene solution.

The reaction mixture containing the support, metallocene compound and solvent may then be isolated by using techniques well known in the art. These include filtration, decantation, evaporation and the like. In one embodiment the reaction mixture is dried under an atmosphere of nitrogen, more preferably under a slow purge, e.g. 10 ml $N_2$/min.

After the supported metallocene product has been isolated, it is reslurried in one of the aforementioned organic solvents. Typically, this involves contacting the solid supported metallocene with about 1 ml to about 30 ml of solvent per gram of product. More preferably, about 2 ml to about 10 ml of solvent per gram of product is employed in this stage of the catalyst component preparation.

The slurry is then contacted with compounds employed in the synthesis of Ziegler-type catalyst components. Specifically, the supported metallocene compound is contacted with at least one organomagnesium compound or complex and at least one transition metal compound. The addition of other catalyst component constituents, such an electron donor, i.e. alcohols, esters, ethers, silanes and the like, are also within the scope of the contemplation of the catalyst component of the present invention. In one embodiment of the instant invention, the supported metallocene component is slurried in an organic solvent within the contemplation of this invention and then contacted with at least one organomagnesium compound or complex which is soluble in that organic solvent. Organomagnesium compounds useful in the present invention are the alkyls, alkoxides or aryls of magnesium or its complexes such as complexes of organomagnesium compounds with alkyl aluminum compounds. Mixtures of organomagnesium compounds and/or complexes are also contemplated herein.

Preferred organomagnesium compounds or complexes include $R^3MgX^1$, $R^4{}_2Mg$ and $(R^3{}_2Mg).nAlR^3{}_3$ where $R^3$ and $R^4$ are each independently alkyl or alkyloxy containing from about 1 to about 12 carbon atoms or aryl or aryloxy containing from about 6 to 10 carbon atoms, such as phenyl, naphthyl, and cyclopentadienyl; n is 0.5–10, and $X^1$ is a halogen, such as chlorine or bromine. Of the organomagnesium compounds contemplated herein, butylethylmagnesium, dibutylmagnesium and methoxymagnesium chloride are particularly preferred.

As stated above, complexes of organomagnesium compounds with organoaluminum compounds can also be used in the instant invention. Magnesium-aluminum complexes are well known in the art, as disclosed in Aishima et al., U.S. Pat. No. 4,004,071 at Column 2, lines 34–40 and Column 3, lines 30–36. The complexes. are prepared according to the teachings of Ziegler et al., Organometallic Compounds XXII: Organomagnesium-Aluminum Complex Compounds, Annalen der Chemie, 605, pp. 93–97 (1957). A preferred organomagnesium complex that may be employed in the instant invention is a dibutylmagnesium-triethylaluminum complex having the trademark, MAGALA, commercially supplied by Akzo Chemicals.

The amount of organomagnesium compound or complex present in the solid mixed metallocene/Ziegler catalyst component of the instant invention comprises about 0.2% to about 10%, said percentages being by weight, and more preferably, the weight percent is in the range from of about 0.4% to about 7%.

This mixture containing the organomagnesium compound or complex and 'supported metallocene is next treated with an alcohol and/or silane. Generally, an alcohol is employed in cases wherein a polyethylene is the desirable polymer. Suitable alcohols that may be employed in the instant invention include aliphatic alcohols containing from 1 to about 12 carbon atoms and aromatic alcohols containing from 6 to 10 carbon atoms. In a preferred embodiment of the present invention, the alcohol is an alkanol containing from 1 to about 5 carbon atoms. Of these, n-butyl alcohol, i.e. n-butanol, is particularly preferred.

The amount of alcohol added to the reaction mixture is generally from about 0.01 to about 5 mmol per gram of support material, e.g. silica. More preferably, the concentration range of alcohol is from about 0.1 to about 2 mmol per gram of silica.

A silane, having the formula $SiH_{4-m}X^4_m$, wherein $X^4$ is a halogen; and m is an integer of 1 to 4, may be utilized. The option of using a silane is typically elected when propylene is polymerized and/or when a cocatalyst comprising the specific aluminoxane mixture of diisobutylaluminum oxide and methylaluminoxane is utilized. Suitable silanes within the contemplation of the above formula are such silanes as silicon tetrachloride, trichlorosilane, tribromosilane, dichlorosilane, dibromosilane and mixtures thereof. Of these silanes, trichlorosilane and silicon tetrachloride are most preferred.

When a silane is utilized, its concentration is preferably from about 0.01 to about 15 mmol per gram of support material. More preferably, the concentration of the silane is from about 0.1 to about 3 mmol per gram of support.

The contacting steps between the supported metallocene and the soluble organomagnesium compound or complex and, thereafter, between the product of that contact and the alcohol and/or silane, usually occur at a temperature in the range of between about 0° C. and about 120° C. More preferably, these contacting steps occur at a temperature in the range of between about 20° C. and about 110° C. Each contacting step occurs over a period of between about 10 minutes and about 4 hours. Preferably, these contacting steps occur over a period of between about ½ hour and about 3½ hours. Still more preferably, each contacting step occurs over a period of between about ½ hour and about 2½ hours. As in the earlier steps, these contacting steps preferably occur in the presence of an organic solvent of the type discussed earlier.

It should be noted that all of the contacting steps described herein are carried out in an inert atmosphere, such as nitrogen or argon; thus, detrimental amounts of air or moisture do not come into direct contact with the solid catalyst.

In a preferred-embodiment, there are two drying steps, i.e. solvent removal. The first occurs after contact with the metallocene and the second after contact with the non-metallocene transition metal compound. In another embodiment, drying occurs after each contacting step.

Typically,. drying is conducted under a blanket of nitrogen, preferably with a slow purge of the same, e.g. 10 ml/min.; the granular coated support may be dried in small volumes in a paddle stirred container with heat supplied from an external source.

The solid product thus obtained, which includes contact with an alcohol, a silane or both, is then contacted with at least one transition metal-containing non-metallocene compound containing a transition metal of Groups 4, 5 or 6 of the Periodic Table of Elements. Such transition metal compounds are well known in the art to be effective in the polymerization of alpha-olefins.

Suitable Group 4 transition metal-containing compounds that may be employed in the instant invention have the formula $M'X^2_p(OR^5)_{4-p}$ wherein M' is a transition metal of Group 4, i.e. titanium, zirconium or hafnium, preferably titanium or zirconium, $R^5$ is $C_1$–$C_{18}$ hydrocarbyl or hydrocarbylsilyl, preferably, aryl, alkyl, aralkyl, cycloalkyl or alkylsilyl; $X^2$ is halogen; p is an integer of 1 to 4; and q is 0 or an integer from 1 to 3. In accordance with the earlier expressed proviso, although titanium is one of the preferred meanings of M', M' cannot be titanium if p is 4 and $X^2$ is chlorine and if the metallocene is zirconocene dichloride of Formula I where M is zirconium.

When M' is titanium, it is preferred that p be an integer from 2 to 4, most preferably 4. It is also preferred that when M' is titanium, $X^2$ is chlorine or bromine, and even more preferably, chlorine. Suitable titanium compounds within the contemplation of this embodiment are thus titanium tetrachloride, titanium tetrabromide, methoxytitanium trichloride, ethoxytitanium trichloride, diethoxytitaniumt-dichloride and the like.

Suitable Group 5 transition metal-containing compounds within the scope of the instant invention are compounds that have the formula $M''(OR^6)_x(O)_y(X^3)_{5-x-2y}$ wherein M" is a transition metal of Group 5 of the Periodic Table of Elements; $R^6$ is a hydrocarbyl having from about 1 to about 18 carbon atoms; $X^3$ is halogen, preferably chlorine or bromine; x is 0 or an integer from 1 to 5; and y is 0 or 1. Although M" may be vanadium, niobium or tantalum, vanadium is especially preferred.

Specific Group 5 transition metal-containing compounds encompassed by the above formula include vanadium oxyhalides, vanadium alkoxides, vanadium carboxylates, vanadium halides and mixtures thereof. Especially preferred embodiments of non-metallocene transition metal compounds that include a Group 5 compound are triisobutyl vanadate, tributyloxyvanadate and vanadium tetrachloride.

Suitable Group 6 transition metal compounds are compounds of the formula $M'''(OR^7)_zX^5_{2-z}$, where M''' is a Group 6 transition metal; $R^7$ is a hydrocarbyl having from 1 to about 18 carbon atoms; $X^5$ is halogen; and z is 0, 1 or 2. Although M''' may be chromium, molybdenum or tungsten, chromiumis particularly preferred.

Contact between the Group 4, 5 and/or 6 transition metal-containing compound and the organomagnesium-containing solid product occurs at a temperature from about 0° C. to about 100° C. More preferably, the temperature of this contacting step is from about 20° C. to about 100° C. Most preferably, the temperature is from about 25° C. to about 50°C.

The time duration of contact between the solid product with the Group 4, 5 and/or 6 transition metal-containing compound(s) is from about 0.25 hr to about 4 hrs. Most preferably, the time of this contacting step is from about 0.25 hr to about 1 hr.

The concentration range of Group 4, 5 and/or 6 transition metal-containing compound(s) employed in the present invention is from about 0.01 to about 5 mmol of the transition metal compound(s) per gram of support material. More preferably, the concentration of Group 4, 5 and/or 6 transition metal-containing compound(s) used in this contacting step is from about 0.05 to about 1.0 mmol of the particular transition metal compound(s) per gram of support.

It should be appreciated that all of the steps in the formation of the mixed catalyst component of this invention, involve contact between a solid and a liquid. This is because each of the compounds contacted with the support or support product are liquids or are. introduced as liquid solutions. As such, no ball-milling or other solid mixing, such as co-pulverization, is required. Ball milling is an expensive and difficult operation, commonly employed in the formation of polymerization catalysts of the prior art. It is emphasized that, as those skilled in the art are aware, the solvents within the scope of the present invention may be allowed to remain in the reaction mass or can be removed by decantation, filtration, evaporation or the like between contacting steps.

The present invention encompasses a catalyst system which includes the above-described solid metallocene/ Ziegler catalyst component and a cocatalyst component capable of activating the solid catalyst component olefin polymerizations. The cocatalyst component of the present invention is an organoaluminum compound. Of the organoaluminum compounds, alkylaluminum compounds are preferred. Alkylaluminum-containing compounds within the contemplation of the cocatalyst of the present invention include trialkylaluminums, alkylaluminum halides, alkylaluminum oxides, alkylaluminum hydrides, aluminoxanes (either cyclic or linear) or mixtures thereof. More preferably, the alkylaluminum-containing compound is an aluminoxane. Of the aluminoxanes, modified methylaluminoxane (MMAO), as defined supra, which is commercially available from Akzo Chemicals, is particularly preferred.

As stated above, a mixture of organoaluminum compounds may be employed as the cocatalyst of the catalyst system of the present invention. Thus, the preferred class of organoaluminum compounds, aluminoxanes may be combined with other organoaluminoxanes. For example, in the preferred embodiment where MMAO is employed as the cocatalyst it may be utilized not only alone but, in addition, in combination with a trialkylaluminum compound or with an alkylaluminum oxide. In a preferred embodiment of the instant invention, a cocatalyst comprising a mixture of MMAO and trimethylaluminum is employed. In accordance with that embodiment of the present invention, less MMAO can be employed without significantly decreasing the activity of the catalyst and without appreciably affecting important physical properties of the polymer produced compared to the polymer prepared employing MMAO alone.

In another preferred embodiment of the instant invention, the cocatalyst is an alkylaluminum oxide, preferably diisobutylaluminum oxide (DIBAL-O), or a mixture of the alkylaluminum oxide and MMAO. By employing DIBAL-O alone, or in a mixture with MMAO, olefin polymers having a higher melt index or flow can be obtained compared to those using MMAO alone. Moreover, by adjusting the relative amounts of DIBAL-O/MMAO, the molecular weight distribution of the resultant polymer can be correlatively affected.

The molar ratio of the cocatalyst, the aluminum-containing compound, to the total number of moles of transition metal in the solid catalyst component is from about 1 to about 2000 moles of aluminum per mole of transition metal. It is emphasized that this ratio is based on the total number of moles of transition metal contributed by both the metallocene and the non-metallocene transition metal compounds. More preferably, the molar ratio of cocatalyst to solid catalyst component is from about 5 to about 500.

In still another aspect of the present invention a process for polymerizing an alpha-olefin or copolymerizing one or more alpha-olefins is set forth. This process comprises (co)polymerizing at least one alpha-olefin under olefin polymerization conditions in the presence of the catalyst system of the present invention. That is, in the presence of the mixed metallocene/Ziegler catalyst component and the aluminum-containing cocatalyst of the instant invention.

In accordance with the present invention the polymerization or copolymerization reaction may occur in a fluidized bed reactor or in a slurry reactor. Such reactors are well known to those skilled in this art.

Olefins suitable for (co)polymerization in this process include alpha-olefins containing from two to twelve carbon atoms such as ethylene, propylene, butene, pentene and the like.

In a particularly preferred embodiment of the present invention, the olefin monomer is ethylene alone or ethylene and butene mixture.

In the preferred embodiment of the instant invention wherein slurry polymerization or copolymerization of one or more olefins occurs, that polymerization process takes place at a temperature in the range of between about 40° C. and about 250° C. More preferably, the temperature of polymerization or copolymerization is in the range of about SOOC and about 150° C. The pressure of the slurry polymerization or copolymerization reaction is in the range of between about 50 psig and about 1000 psig, more preferably, between about 100 psig and about 700 psig. This olefin polymerization or copolymerization may occur in the presence of hydrogen gas.

In the preferred embodiment involving gas phase polymerization of one or more olefins, employing the catalyst system oft he present invention, that process occurs at a temperature in the range of between about 40° C. and about 150° C. More preferably, the temperature of polymerization or copolymerization is in the range of between about 50° C. and about 120° C. The pressure maintained during the gas phase polymerization or copolymerization is in the range of between about 80 psig and about 600 psig, more preferably about 100 psig and about 500 psig. Again, polymerization may occur in the presence of hydrogen gas.

The polyolefin polymers produced using the mixed metallocene/Ziegler catalyst component of the instant invention may have a bimodal molecular weight distribution (MWD). Moreover, the polymers produced in the instant invention have improved optical properties, such as gloss and haze, and improved physical properties, such as impact strength, TD tear and tensile strength, as compared to polymers produced using either a standard Ziegler-type catalysts or a mixed system wherein a metallocene is employed in the final step of the catalyst preparation. Furthermore, the polymers produced in the present invention exhibit a low level of fines, and a higher molecular weight compared to polymers prepared from typical homogeneous me tallocene catalysts or other mixed catalyst systems disclosed in the prior art.

The following examples are given to illustrate the scope of this invention. Because these examples are given for illustrative purposes only, the present invention should not be limited thereto.

EXAMPLE 1

Preparation of a Catalyst Component

A catalyst component was prepared in accordance with the instant invention. Specifically, a catalyst component was prepared by introducing 66 g of neat $(Cp)_2HfCl_2$ into a blender. Next, 6,895 ml of toluene was added thereto and the contents thereof were heated to 89° F. (32° C.) with continuous mixing for about 1 hr. After this period of time, 1725 g of Davison [trademark] 948 silica which was previously treated with hexamethyl disilazane, as described in U.S. Pat. No. 4,374,745, was added to the blender. The contents of the blender were then mixed at a temperature of about 150° F. (66° C.) for about 1 hr. After this period of time, the supported metallocene catalyst was dried at a temperature of from about 90° F.–180° F. (32° C.–82° C.) under a gaseous $N_2$ blanket to remove the solvent.

Next, 5,846 ml heptane was added to the blender. The thus formed slurry was stirred at room temperature for about 30 minutes. Thereafter, 1,959 ml of a 10.1 wt % solution of butylmagnesium-triethylaluminum complex (MAGALA, supplied by Akzo Chemicals) in heptane, at a temperature of about 97° F. (36° C.), was introduced into the blender. The contents of the blender were then mixed for about 30 minutes. After mixing, 356 ml of n-butanol (25 wt % in heptane) was added to the blender and the contents thereof were mixed for about 30 minutes. After this period of time, 552 ml of $TiCl_4$ (25 wt % in heptane) was introduced into the blender and the slurry was stirred for about 45 minutes. Next, the thus formed catalyst component was dried in the blender at a temperature of from about 85° F.–190° F. (29° C.–88° C.). This drying process continued until the catalyst was completely dried.

Polymerization of Ethylene-Butene Copolymer

The polymerization of ethylene was conducted in a gas phase reactor operated at a pressure of 300 psig and a temperature of 175° F. (79° C.). Specifically, the above prepared catalyst component was injected above the distribution plate of the gas phase reactor. MMAO type 3A methyl aluminoxane from Akzo Chemical was fed into the reactor at a rate of about 40 g/hr. Hydrogen and butene, present in a molar ratio, was also introduced into the reactor in amounts such that the mole ratio of hydrogen to ethylene was about 0.11 and the production rate was about 20 lb/hr. The molar ratio of butene to ethylene. was about 0.44.

The polymerization results using the above mixed metallocene/Ziegler catalyst are summarized in Table I. Also shown in Table I is the polymer data in both powder and pellet form. The pellets were formed using conventional procedures well known to those skilled in the art.

It should be understood that in Table I the term "ER" denotes elasticity. More specifically, ER is an index of the polydispersity which is derived. from rheological data of polymer melts. ER generally characterizes the breadth of the molecular weight distribution at the high molecular weight end of a polymer.

Determination of ER requires frequency response data in the linear viscoelastic region. That is, ER is derived from the measured dynamic storage modulus, G', and loss modulus, G", as a function of frequency. Generally speaking, G' is a measure of energy stored and recovered per cycle of sinusoidal deformation; G" is a measure of energy dissipated or lost as heat per cycle. In one method, G' versus G"is plotted on logarithmic coordinates resulting in a curve that is dependent upon molecular weight distribution (MWD) and/ or long chain branching (LCB) and is practically independent of temperature and molecular weight. Curves of this sort are generally known as Modified Cole-Cole Plots, as described, for example, by E. R. Harrel et al. in *Journal of Applied Polymer Science*, 29:995–1010 (1984.); C. D. Han et al. in *Polymer Engineering Reviews*, 2(2):135–165(1982); and N. Nakajima et al. "Modified Cole-Cole Plot as a Tool for Rheological Analysis of Polymers" in Current Topics in Polymer Science", Vol. II, Ottenbrite et al., Eds., Hanser Publishers (1987). The contents of all of these references are incorporated herein by reference, including ASTM D 4440-84 which is directed to "Standard Practice for Rheological Measurement of Polymer Melts Using Dynamic Mechanical Properties".

Polydispersity at the high molecular weight end is reflected as higher G' values. Procedurally, a rheometer capable of measuring dynamic mechanical properties of polymer melts over a wide range of frequencies can be used, such as Rheometrics Mechanical Spectrometer Model 605 or 705 or Rheometrics Dynamic Analyzer RDA2, all of which utilize discrete frequencies to cover a wide range.

As will be appreciated by those of skill in the art, if the plot of lnG' versus lnG" is even slightly nonlinear, the resulting ER may be unreliable; an indication of this is if the correlation coefficient of the first order lnG' versus lnG" fit is less than 0.999. Mathematically, ER can be computed by fitting lnG' versus lnG" for the nine lowest frequency points to a linear equation and extrapolating it to calculate G' at $G''=5\times10^3$ dynes/cm$^2$. ER is then calculated from the equation: ER=$(1.781\times10^{-3})$G' at a value of G"=$5\times10^3$ dynes/cm$^2$ The other polymer properties tabulated in Table I were determined using the following procedures:

MI: ASTM 1238, Condition E

Density: ASTM D-2839

Bulk Density: Measurements were preformed on an unmodified reactor powder sample by pouring the sample through a 33 mm ID funnel into a 100 cc stainless steel cup without tapping or shaking, then leveling off the top with a straight edge and weighing by difference.

Median Particle Size: Malvern Particle Sizer Series 2600.

Fines: <180μas measured by the Malvern Particle Sizer.

Mw/Mn: The ratio of weight average molecular weight, Mw, to number average molecular weight, Mn, is equal to the MWD of the polymer. This was determined using a Waters GPC on a mixed sized, crosslinked divinylbenzene column with 1,2,4-trichlorobenzene as a solvent at 135° C. with a refractive index detector.

The test for oligomeric content in the polymer was carried out by extracting a ground polymer. sample with cyclohexane for about 3.5 hrs at about 55° C., and then injecting a portion of the filtrate into a gas chromatography for separation and quantification of the even numbered ($C_8$–$C_{26}$) straight chain oligomers. The sum of the $C_8$–$C_{18}$ obligomers is reported herein.

RDR, which represents an overall polydispersity of a polymer, was calculated in the instant invention using the method described in the article by R. Schroff et al. entitled "New Measures of Polydispersity from Rheological Data on Polymer Melts", *J. Appl. Polymer Science*, 57:1605–1626 (1995).

Film Properties:

The pellets prepared from the polymer obtained above using the catalyst of this invention, were processed on a single layer blown film extrusion line. That extrusion line included a 2 inch diameter screw (24:1 L/D), a 4-inch die,. a 110 mils die gap and a dual lip air ring. Specifically, the pellets were heated to a temperature of 425° F. and thereafter extruded at a rate of 6.4 lbs/hrs-inch of die circumference, a blow-up ratio of 2.2:1 and a frost line height of 14 inches. The properties of the film thus prepared are also tabulated in Table I.

The film properties summarized in Table I were determined using the following procedures.

| | |
|---|---|
| Gloss | ASTM D-2454 |
| Haze | ASTM D-1003 |
| Tensile Yield MD/TD* | ASTM D-882 |
| Tensile Ultimate MD/TD* | ASTM D-882 |
| Yield Elongation MD/TD* | ASTM D-882 |
| Break Elongation MD/TD* | ASTM D-882 |
| Secant Modulus MD/TD* | ASTM D-882 |
| Tear MD/TD* | ASTM D-1922 |
| TEDD[a] Impact | ASTM D-4272 |

*MD denotes machine direction and TD denotes transverse direction.
[a]TEDD denotes total energy drop dart.

COMPARATIVE EXAMPLE 1

A catalyst component was prepared and used in the polymerization of ethylene as follows:

To a blender was added 83.5 g of neat $(Cp)_2ZrCl_2$ and 10,370 ml of toluene. The contents of the blender were heated to 125° F. (52° C.) and stirred for about 1 hr. Next, 2858 g of the below described Ziegler catalyst was added to the blender and the contents were then mixed for an additional hour. The thus formed catalyst was then dried using the conditions described in Example 1.

The 2858 g of Ziegler catalyst added to the blender was prepared in accordance with the method employed in Example 1 except that the silica was not reacted with $(Cp)_2ZrCl_2$ and toluene.

The catalyst component thus produced was utilized to polymerize ethylene using the polymerization conditions set forth in Example 1 except that the MMAO feed rate was 96.2 g/hr, the mole ratio of hydrogen to ethylene was 0.11 and the mole ratio of butene to ethylene was 0.24. The results of this polymerization are tabulated in Table I under the heading "CE1".

A comparison of the data set forth in Table I for this comparative example and Example 1 indicates that the catalyst of Example 1, in accordance with the instant invention, has a higher activity, measured in terms of productivity, than the catalyst of CE1. Moreover, the polyethylene polymer produced using the catalyst of Example 1 has a lower level of fines in the final product compared to the polymer produced in CE 1 based on visual observation of excessive fines being produced from the catalyst in CE 1.

A summary of this example is included in Table I.

EXAMPLE 2

A mixed metallocene/Ziegler catalyst component within the scope of the instant invention was prepared by introducing 154 g of $(Cp)_2HfCl_2$ and 16,239 ml of toluene into a blender. The contents of the blender were then heated to 150° F. (66° C.) and held at this temperature for about 1 hr. Next, 4063 g of HMDS-treated Davison [trademark] silica was introduced into the blender and the contents thereof were mixed at 150° F. (66° C.) for about 1 hr. The supported metallocene was then dried at a temperature of from about 90° F.–180° F. (32° C.–82° C.).

After the supported metallocene was completely dried, 2449 g of the supported metallocene was added to a second blender. Next, 8307 ml of heptane was added to the second blender and thereafter 2784 ml of Magala 7.5 E (10 wt % in heptane) was added to the blend at a temperature of about 97° F. (36° C.). The contents of the blender were then mixed for about 45 minutes. After mixing, 505 ml of n-butanol (25 wt % in heptane) was added to the blender and the contents were then mixed for about 30 minutes.

Next, 2363 ml of $VCl_4$, (10 wt % in heptane) was introduced into the blender at a temperature of about 101° F. (38° C.) then the contents were mixed for about 1 hr and then dried using the procedure set forth in Example 1.

The catalyst component thus produced was utilized to polymerize ethylene using the polymerization conditions set forth in Example 1 except that dibromomethane was also fed into the reactor at a feed rate of about 45 g/hr.

The polymerization data and physical properties of the powder and pellet form of the polymer are included in Table I.

COMPARATIVE EXAMPLE 2

A catalyst component was prepared in accordance with the procedure set forth in Example 1 except that the (Cp)$_2$HfCl$_2$ (66 g) of that example was replaced with $(Cp)_2ZrCl_2$ (141.2 g). The same toluene solvent was employed albeit in an amount of 19,323 ml rather than 6,895 ml used in Example 1. The same HMDS-treated silica was utilized, however, in an amount of 4831 g rather than the 1725 g employed in Example 1. The thus formed slurry was heated for 1 hour at 120° F. (49° C.) rather than 150° F. (66° C.) used in Example 1.

Dried supported metallocene (1950 g), prepared in accordance with the procedure enumerated above, was slurried in heptane which was present in an amount of 6,615 ml rather than 5,846 ml used in Example 1. The product was next contacted with the same components utilized in Example 1 but for the amounts utilized. The table below reports the amounts of the constituents which were introduced in the same order as in Example 1.

| Example | MAGALA | n-butanol | TiCl$_4$ |
|---|---|---|---|
| CE2 | 2195 ml (10 wt. % in heptane) | 193 ml (50 wt. % in heptane) | 1032 ml (20 wt. % in heptane) |
| 1 | 1959 ml (10.1 wt. % in heptane) | 356 ml (25 wt. % in heptane) | 552 ml (25 wt. % in heptane) |

The thus formed catalyst component was utilized to polymerize ethylene and butene in accordance with the procedure set forth in Example 1 except that 40 g/hr feed of that example was replaced with a feed rate of 82.4 g/hr. The mole ratio of hydrogen to butene was 0.12 rather than the 0.11 ratio of Example 1. The mole ratio of butene to ethylene, as in Example 1, was about 0.44.

The results of this example are tabulated in Table I.

TABLE I

| EXAMPLE | 1 | CE1 | 2 | CE2 |
|---|---|---|---|---|
| Ti or V (ppm) | 2.0 | 3.2 | 4.8 | 1.9 |
| Productivity (lb/lb) | 8,100 | 5,900 | 1,400 | 11,300 |
| POWDER PROPERTIES | | | | |
| MI (g/10 min) | 1.3 | 0.9 | 1.2 | 1.5 |
| Density (g/cc) | 0.918 | 0.930 | 0.917 | 0.919 |
| Bulk Density (lb/ft$^3$) | — | 25 | — | 22 |

TABLE I-continued

| EXAMPLE | 1 | CE1 | 2 | CE2 |
|---|---|---|---|---|
| Median Particle Size ($\mu$m) | — | — | — | 780 |
| Fines <180 $\mu$m (%) | — | — | — | 2.6 |
| Mw/Mn | — | 15.3 | — | 10.3 |
| Oligom., $C_8$–$C_{18}$ (ppm) | 320 | — | 1,128 | 750 |
| PELLET PROPERTIES | | | | |
| MI (g/10 min) | 1.0 | — | 0.3 | 1.39 |
| Density (g/cc) | 0.918 | — | 0.919 | 0.918 |
| Mw/Mn | 4.7 | — | 13.8 | 2.35 |
| RdR(A = 2.0) | 1.93 | — | 6.9 (A = 2.5) | 2.35 |
| ER | 0.78 | — | 2.77 | 0.79 |
| Ti Residuals (ppm) | 2.4 | — | — | 1.7 |
| FILM PROPERTIES | | | | |
| Gloss | 59.0 | — | — | 46.0 |
| Haze | 9.0 | — | — | 9.2 |
| Tensile Yield MD/TD (psi) | 1,427/ 1,296 | — | — | 1,340/ 1,310 |
| Tensile Yield Ultimate MD/TD (psi) | 5,271/ 3,895 | — | — | 2,010/ 1,770 |
| Yield Elong., MD/TD (%) | 15/14 | — | — | 18/18 |
| Break Elong., MD/TD (%) | 463/564 | — | — | 537/551 |
| Secant Modulus MD/TD (psi) | 23,661/ 27,982 | — | — | 17,500/ 20,000 |
| Tear MD/TD (g) | 187/416 | — | — | 170.7/ 362.7 |
| TEDD Impact (ft/lbs) | 1.42 | — | — | 0.65 |

The data in Table I shows that films made from polymers obtained using the mixed catalyst of the instant invention exhibit significantly improved optical properties (gloss and haze), significantly improved impact as well as-improved tear and tensile properties as opposed to films prepared using conventional Ziegler-type catalysts, as represented by the film data in Table II, below for a standard Ziegler-type catalyst.

TABLE II

| PELLET PROPERTIES | |
|---|---|
| MI (g/10 min) | 1.3 |
| Density (g/cc) | 0.9215 |
| FILM PROPERTIES | |
| Gloss | 39.0 |
| Haze | 16.8 |
| Tensile Yield MD/TD (psi) | 1656/1793 |
| Tensile Ultimate MD/TD (psi) | 5024/3342 |
| Yield Elong. MD/TD (%) | 14/11 |
| Break Elong. MD/TD (%) | 700/727 |
| Secant Modulus MD/TD (psi) | 25431/34921 |
| Tear MD/TD (g) | 219/320 |
| TEDD Impact (ft/lbs) | 0.73 |

The above embodiments and examples are given to illustrate the scope and spirit of the present invention. These embodiments and examples will make apparent, to those skilled in the art, other embodiments and examples. These other embodiments and examples are within the contemplation of the present invention; therefore, the instant invention should be limited only by the appended claims.

What is claimed is:

1. A catalyst component formed by the steps of:
    (a) contacting a metallocene with a support selected from the group consisting of silica having a surface area of between about 50 m$^2$/g and about 500 m$^2$/g and a pore volume of between about 0.5 cc/g and about 2.4 cc/g and an organic solid, said metallocene having a formula selected from the group consisting of
    (A) $(Cp)_a MR_b X_c$,
    (B) $(CpR^1_k)_g R^2_s (CpR^1_k) MQ_{3-g}$, and
    (C) $R^2_s (CpR^1_k)_2 MQ'$
    wherein Cp is a cyclopentadienyl, indenyl or fluorenyl; M is a Group 4–6 transition metal; R is hydrogen or $C_1$–$C_{20}$ hydrocarbyl; X is halogen; a is an integer of 1 to 3; b is 0 or an integer of 1 to 3; c is 0 or an integer of 1 to 3 with the proviso that the sum of a, b, and c is equal to the oxidation state of M; $R^1$ is the same or different and is hydrogen, hydrocarbyl, or two carbon atoms connected together to form a ring including said Cp group; $R^2$ is $C_1$–$C_4$ alkylene, dialkyl germanium, dialkyl silicon, an alkyl phosphine group or an alkyl amine group bridging two $(CpR^1_k)$ rings; Q is the same or different and is $C_1$–$C_{20}$ hydrocarbyl, $C_1$–$C_{20}$ hydrocarbyloxy or halogen; Q' is $C_1$–$C_{20}$ alkylidiene; s is 0 or 1; g is 0, 1, or 2, with the proviso that s is 0 when g is 0; and k is an integer of 1 to 5;
    (b) contacting the product of step (a) with an organomagnesium compound or complex;
    (c) contacting the product of step (b) with an alcohol and a silane having the formula $SiH_{4-m}X^4_m$, wherein $X^4$ is halogen; and m is an integer of 1 to 4; and
    (d) contacting the product of step (c) with a non-metallocene transition metal-containing compound, said non-metallocene compound including a Group 4–6 transition metal with the proviso that the non-metallocene compound does not include titanium when the metallocene has the formula (A) where M is zirconium.

2. The catalyst component of claim 1 wherein M is zirconium, hafnium, titanium, vanadium, or chromium.

3. The catalyst component of claim 1 wherein the organomagnesium compound or complex is selected from the group consisting of a compound having the formula $R^3 MgX^1$, a compound having the formula $R^3_2 Mg$, and a complex having the formula $R^3_2 Mg \cdot nAlR^3_3$, where $R^3$ is the same or different $C_1$–$C_{12}$ hydrocarbyl, or $C_1$–$C_{12}$ hydrocarbyloxy; $X^1$ is halogen; and n is 0.5 to 10.

4. The catalyst component of claim 3 wherein the organomagnesium compound or complex is selected from the group consisting of butylethylmagnesium, dibutylmagnesium, methoxymagnesium chloride, and a dibutylmagnesium-triethylaluminum complex.

5. The catalyst component of claim 1 wherein the alcohol is selected from the group consisting of $C_1$–$C_{12}$ aliphatic alcohols and $C_6$–$C_{10}$ aromatic alcohols.

6. The catalyst component of claim 5 wherein the alcohol is n-butanol.

7. The catalyst component of claim 1 wherein the silane is selected from the group consisting of silicon tetrabride, trichlorosilane, tribromosilaine, dichlorosilane, and dibromosilane.

8. The catalyst component of claim 1 wherein the non-metallocene transition metal-containing compound is selected from the group consisting of a compound having the formula $M'X^2_p(OR^5)_{4-p}$, $M''(OR^6)_x(O)_y(X^3)_{5-x-2y}$ and $M'''(OR^7)_z X^5_{2-z}$, where M' is a Group 4 transition metal; M'' is a Group 5 transition metal; M''' is a Group 6 transition metal; $X^2$, $X^3$, and $X^5$ are halogen; $R^5$ is a $C_1$–$C_{18}$ hydrocarbyl or a $C_1$–$C_{18}$ hydrocarbylsilyl; ; $R^6$ is a $C_1$–$C_{18}$ hydrocarbyl; $R^7$ is a $C_1$–$C_{18}$ hydrocarbyl; p is an integer of 1 to 4; x is 0 or an integer of 1 to 5; y is 0 or 1; and z is 0, 1 or 2.

9. The catalyst component of claim 8 wherein the non-metallocene transition metal-containing compound is selected from the group consisting of titanium tetrachloride, titanium tetrabromide, methoxytitanium trichloride, ethoxytitanium trichloride, diethoxytitanium dichloride, and tri-isobutylvanadate.

10. The catalyst component of claim 1 wherein the organic solid is a polyolefin.

11. The catalyst component of claim 1 wherein the metallocene is furnished in a solution the volume of which is no greater than the total pore volume of the support with which it is contacted.

12. The catalyst component of claim 11 wherein the metallocene is furnished in a solution the volume of between about 40% and 100% of the total pore volume of the support with which it is contacted.

13. A catalyst composition comprising the catalyst component of claim 1 and an aluminum-containing cocatalyst.

14. The catalyst composition of claim 13 wherein the cocatalyst is selected from the group consisting of a trialkylaluminum compound, an alkylaluminum halide compound, an alkylaluminum oxide compound, an alkylaluminum hydride compound, a cyclic aluminoxane, a linear aluminoxane, and mixtures thereof.

* * * * *